May 6, 1924.
G. H. REIMER
AUTOMOBILE GLARE SHIELD
Filed May 17, 1922
1,492,748
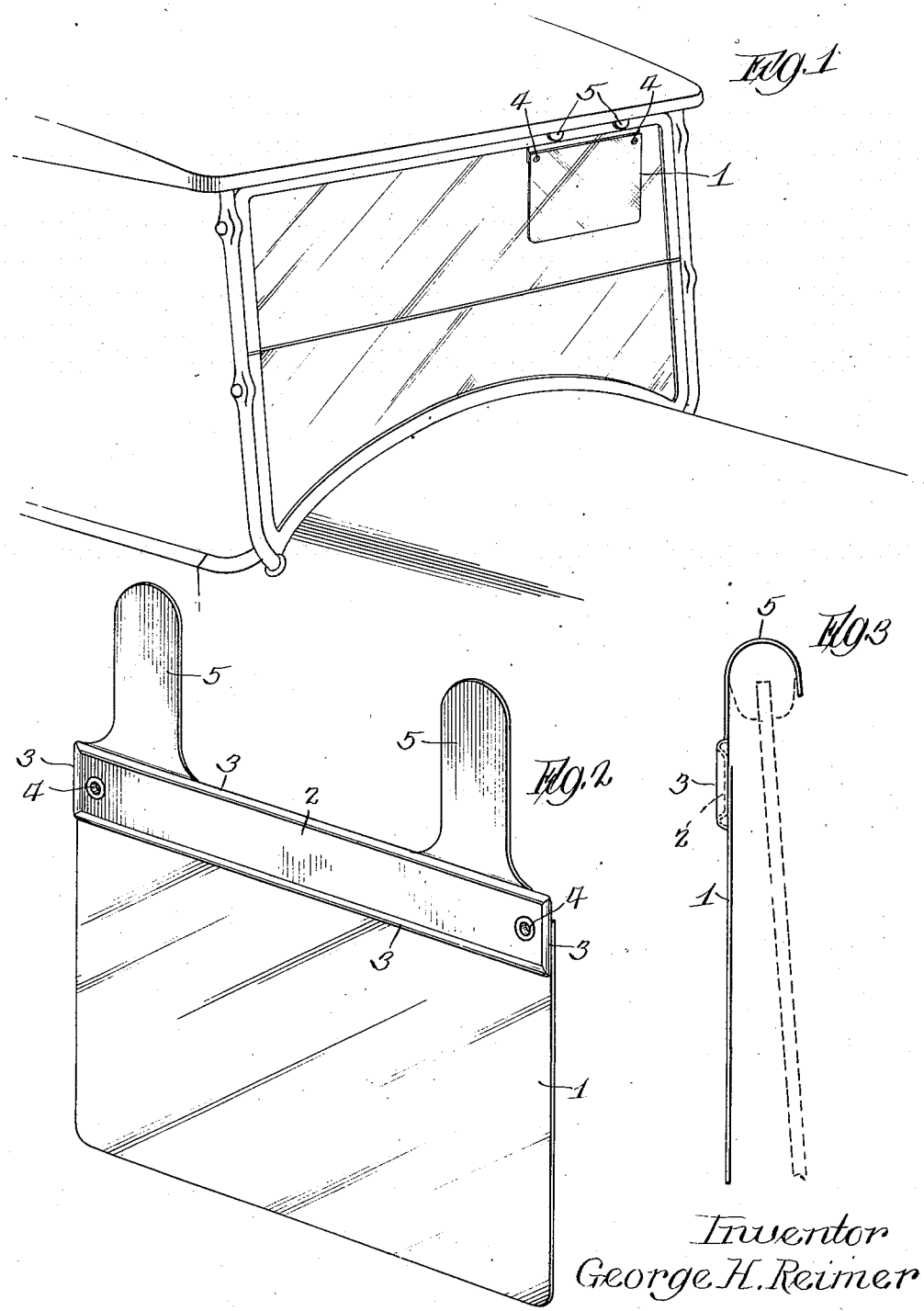
Inventor
George H. Reimer
by Arthur F. Durand
Atty.

Patented May 6, 1924.

1,492,748

UNITED STATES PATENT OFFICE.

GEORGE H. REIMER, OF FULTON, ILLINOIS, ASSIGNOR TO PATENT NOVELTY COMPANY, OF FULTON, ILLINOIS, A CORPORATION OF ILLINOIS.

AUTOMOBILE GLARE SHIELD.

Application filed May 17, 1922. Serial No. 561,609.

*To all whom it may concern:*

Be it known that I, GEORGE H. REIMER, a citizen of the United States, and resident of Fulton, Whiteside County, Illinois, have invented a certain new and useful Improvement in Automobile Glare Shields, of which the following is a specification.

This invention relates to automobile glare shields of that kind in which a section of translucent or semi-transparent material, such as a sheet of green celluloid, is provided with means for attaching the device to the windshield of a vehicle, in front of the driver, so that the glare of headlights coming toward the vehicle will be modified and made less disagreeable to the driver, inasmuch as the device is hung on the windshield in such position that the driver looks through it toward the road and the machines coming in the opposite direction.

Generally stated, the object of the invention is to provide a novel and improved construction whereby a glare shield of this kind may be conveniently hung in different positions on the frame of the wind-shield, in a simple and convenient maner, without the necessity of using screws or other similar fastening means, whereby the device is not supported on the glass or transparent portion of the wind-shield, but entirely on the frame thereof, as will hereinafter more fully appear.

To these and other useful ends the invention consists in matters hereinafter set forth and claimed and shown in the accompanying drawings in which—

Figure 1 is a perspective of the front portion of an automobile showing the windshield thereof provided with a glare shield embodying the principles of the invention.

Figure 2 is a perspective of said glare shield.

Figure 3 is a side elevation or edge view of said glare shield.

As thus illustrated, the invention comprises, preferably, a sheet of translucent material 1, such as green celluloid, or some semi-transparent material which is preferably flexible and not liable to break. The sheet metal mounting or body portion 2 comprises a single piece of sheet metal pressed into shape to form a rectangular space surrounded by the bead or pressed out ridge 3, and holes are made in the end portions of this rectangular space portion to permit the insertion of rivets 4 by which to secure the mounting to the sheet 1 of material previously mentioned. The upper edge of the mounting or long strip 2 is provided with parallel attaching portions or tabs 5 spaced apart and formed in the manner shown, which extends at right angles to the strip, so that when finished the entire glare shield is practically flat and can be easily shipped by express or even sent through the mails in an envelope. The rectangular space surrounding the ridges 3 can be utilized for advertising purposes if so desired. The flexible material 1 is unrestrained everywhere except where perforated for the rivets 4, at its upper edge. Thus the whole thing is flat and flexible in an envelope, and the sheet may also conform by flexing to any place or position where it is used.

In use the attaching portions 5 are simply bent over the frame of the wind-shield, at any convenient point on the wind-shield, as, for example, shown in Figure 1 of the drawings. When thus attached, the glare shield can be moved from one side of the vehicle to the other, according to the position of the driver, and will shield the eyes of the driver against the glare from headlights of machines coming in the opposite direction. As wind-shields are made in different ways, it will be possible, by means of the flexible attaching portions 5, to attach the device in many different ways. As thus constructed, the device is simple and very inexpensive to manufacture, and is at the same time serviceable and entirely effective for the purpose intended.

While the glare shield is shown as being used on the windshield of an automobile, it will be understood that the invention can be used in any suitable position, or in any suitable manner, for the purpose of dimming the light of the lamp of an automobile, and for this purpose may be hung on any suitable support.

Obviously the sheet material 1, being celluloid, is flexible and resilient, but the sheet metal portions 5 are flexible but non-resilient in order to retain their shape when bent into hook form as shown in Fig. 3 of the drawings.

What I claim as my invention is—

1. A flexible glare shield for windshields, embodying a flat sheet of flexible and resilient translucent material having attached to one edge a pair of spaced thin flat metal attaching tabs extending upward substantially in the plane of the sheet and being spaced apart and constructed of malleable or soft metal to thereby permit the device to be mailed flat and whereby the user, by means of his fingers alone, is enable to bend each tab into the desired hook form for engagement with the edge of the windshield that is to serve as a support for the glare shield, said sheet of translucent material being flexible so that it may bend in an envelope while being transmitted through the mails, but being resilient in order that it may return to its normal flat condition, when bent out of shape, and said attaching means being flexible to permit bending thereof into the desired shape for attachment to said support, and said attaching means being non-resilient to enable it to retain its shape when distorted in the desired manner.

2. A flexible glare shield for windshields, constructed in a manner to permit mailing in a flat condition in an ordinary envelope, embodying a flat sheet of flexible and resilient translucent material having projecting from one edge thereof a straight attaching member extending substantially in the plane of the sheet and formed of material which can be easily bent over a support without tools and that will inherently retain the shape into which it is bent, said sheet of translucent material being flexible so that it may bend in an envelope while being transmitted through the mails but being resilient in order that it may return to its normal flat condition, when bent out of shape, and said attaching means being flexible to permit bending thereof into the desired shape for attachment to said support, and said attaching means being non-resilient to enable it to retain its shape when distorted in the desired manner.

GEORGE H. REIMER.